(12) United States Patent
Karube et al.

(10) Patent No.: US 9,319,762 B2
(45) Date of Patent: Apr. 19, 2016

(54) WATER-PROOF SOUND TRANSMITTING MEMBER

(75) Inventors: Yuki Karube, Osaka (JP); Yuichi Abe, Osaka (JP); Yuri Horie, Osaka (JP)

(73) Assignee: Nitto Denko Corporation, Osaka (JP)

( * ) Notice: Subject to any disclaimer, the term of this patent is extended or adjusted under 35 U.S.C. 154(b) by 280 days.

(21) Appl. No.: 14/122,520

(22) PCT Filed: Apr. 2, 2012

(86) PCT No.: PCT/JP2012/002264
§ 371 (c)(1),
(2), (4) Date: Nov. 26, 2013

(87) PCT Pub. No.: WO2012/164800
PCT Pub. Date: Dec. 6, 2012

(65) Prior Publication Data
US 2014/0079268 A1    Mar. 20, 2014

(30) Foreign Application Priority Data

Jun. 1, 2011    (JP) ................................ 2011-123184

(51) Int. Cl.
| | | |
|---|---|---|
| *H04R 1/02* | (2006.01) | |
| *H04R 9/06* | (2006.01) | |
| H04M 1/03 | (2006.01) | |
| H04R 1/44 | (2006.01) | |
| H04M 1/18 | (2006.01) | |

(52) U.S. Cl.
CPC . *H04R 1/02* (2013.01); *H04M 1/03* (2013.01); *H04M 1/18* (2013.01); *H04R 1/44* (2013.01); *H04R 2499/11* (2013.01)

(58) Field of Classification Search
CPC ........ H04R 1/02; H04R 1/44; H04R 2499/11; H04M 1/03; H04M 1/18
USPC .......................................... 381/334, 345, 160
See application file for complete search history.

(56) References Cited

U.S. PATENT DOCUMENTS

| | | | |
|---|---|---|---|
| 8,431,204 B2 | 4/2013 | Ueki et al. | |
| 2010/0206660 A1 | 8/2010 | Horie et al. | |
| 2011/0117304 A1* | 5/2011 | Ueki ..................... | H04R 1/023 428/36.5 |

FOREIGN PATENT DOCUMENTS

| | | |
|---|---|---|
| JP | 2008-237949 | 10/2008 |
| JP | 2010-004397 | 1/2010 |
| WO | 2009/011315 | 1/2009 |

* cited by examiner

*Primary Examiner* — Paul S Kim
(74) *Attorney, Agent, or Firm* — Hamre, Schumann, Mueller & Larson, P.C.

(57) ABSTRACT

Provided is a water-proof sound transmitting member that is less likely to be bonded to a housing at a position other than a normal attachment position. The present invention provides a waterproof sound transmitting member (2) having a multi-layer structure. This water-proof sound transmitting member (2) includes: a water-proof sound transmitting membrane (11) to be attached to a housing having a hole that allows sound to pass therethrough; a support layer (12) to be attached to the housing together with the waterproof sound transmitting membrane (11), the support layer (12) allowing sound to pass therethrough; and a housing-side adhesive layer (21) for bonding the waterproof sound transmitting membrane (11) to the housing. The entire peripheral portion of the support layer (12) extends outwardly beyond the housing-side adhesive layer (21).

5 Claims, 4 Drawing Sheets

WATER-PROOF SOUND TRANSMITTING MEMBER

TECHNICAL FIELD

The present invention relates to a water-proof sound transmitting member having a multilayer structure, in which a support layer is provided on or above a water-proof sound transmitting membrane for a housing of an electronic apparatus equipped with sound devices such as a speaker and a microphone.

BACKGROUND ART

In electronic apparatuses such as a cellular phone, a cordless phone, and a digital camera, sound devices are placed in housings. The housing has an opening for allowing sound to pass therethrough. In order to prevent water from entering the housing through this opening, a water-proof sound transmitting membrane that blocks passage of water through the opening while allowing passage of sound therethrough is attached to the opening. For example, Patent Literature 1 describes a water-proof sound transmitting member including a water-proof sound transmitting membrane. In this water-proof sound transmitting member, a housing-side adhesive layer for bonding the water-proof sound transmitting member to the housing, the water-proof sound transmitting membrane, and a support layer for reinforcing the water-proof sound transmitting membrane are laminated in this order.

CITATION LIST

Patent Literature

Patent Literature 1: JP 2008-237949 A

SUMMARY OF INVENTION

Technical Problem

In the water-proof sound transmitting member of Patent Literature 1, the housing-side adhesive layer, the water-proof sound transmitting membrane, and the support layer are laminated so that the end faces of these components are aligned with one another. However, the water-proof sound transmitting member configured as described above may cause the following problem when the water-proof sound transmitting member is attached to the housing. If the end face of the water-proof sound transmitting member accidentally comes into contact with the housing, the end face of the housing-side adhesive layer is bonded to the housing, and thereby the end face of the water-proof sound transmitting member is bonded to the housing at a position other than the normal attachment position. With the recent reduction in size and thickness of electronic apparatuses, the distance between the attachment position and the wall surface of the housing has been reduced. Therefore, the above-mentioned problem has become apparent.

Under these circumstances, it is an object of the present invention to provide a water-proof sound transmitting member that is less likely to be bonded to the housing at a position other than the normal attachment position.

Solution to Problem

The present invention provides a waterproof sound transmitting member having a multilayer structure. This water-proof sound transmitting member includes: a water-proof sound transmitting membrane to be attached to a housing having a hole that allows sound to pass therethrough; a support layer to be attached to the housing together with the waterproof sound transmitting membrane, the support layer allowing sound to pass therethrough; and a housing-side adhesive layer for bonding the water-proof sound transmitting membrane to the housing. The entire peripheral portion of the support layer extends outwardly beyond the housing-side adhesive layer.

Advantageous Effects of Invention

In the water-proof sound transmitting member of the present invention, the entire peripheral portion of the support layer extends outwardly beyond the housing-side adhesive layer. Therefore, even if the end face of the waterproof sound transmitting member accidentally comes into contact with the housing when the water-proof sound transmitting member is attached to the housing, only the end face of the support layer contacts the housing and the end face of the housing-side adhesive layer never contacts the housing. This means that the present invention reduces the risk of causing the water-proof sound transmitting member to be bonded to the housing at a position other than the normal attachment position.

DESCRIPTION OF EMBODIMENTS

Hereinafter, an embodiment of the present invention is described with reference to the accompanying drawings.

Figure 1:
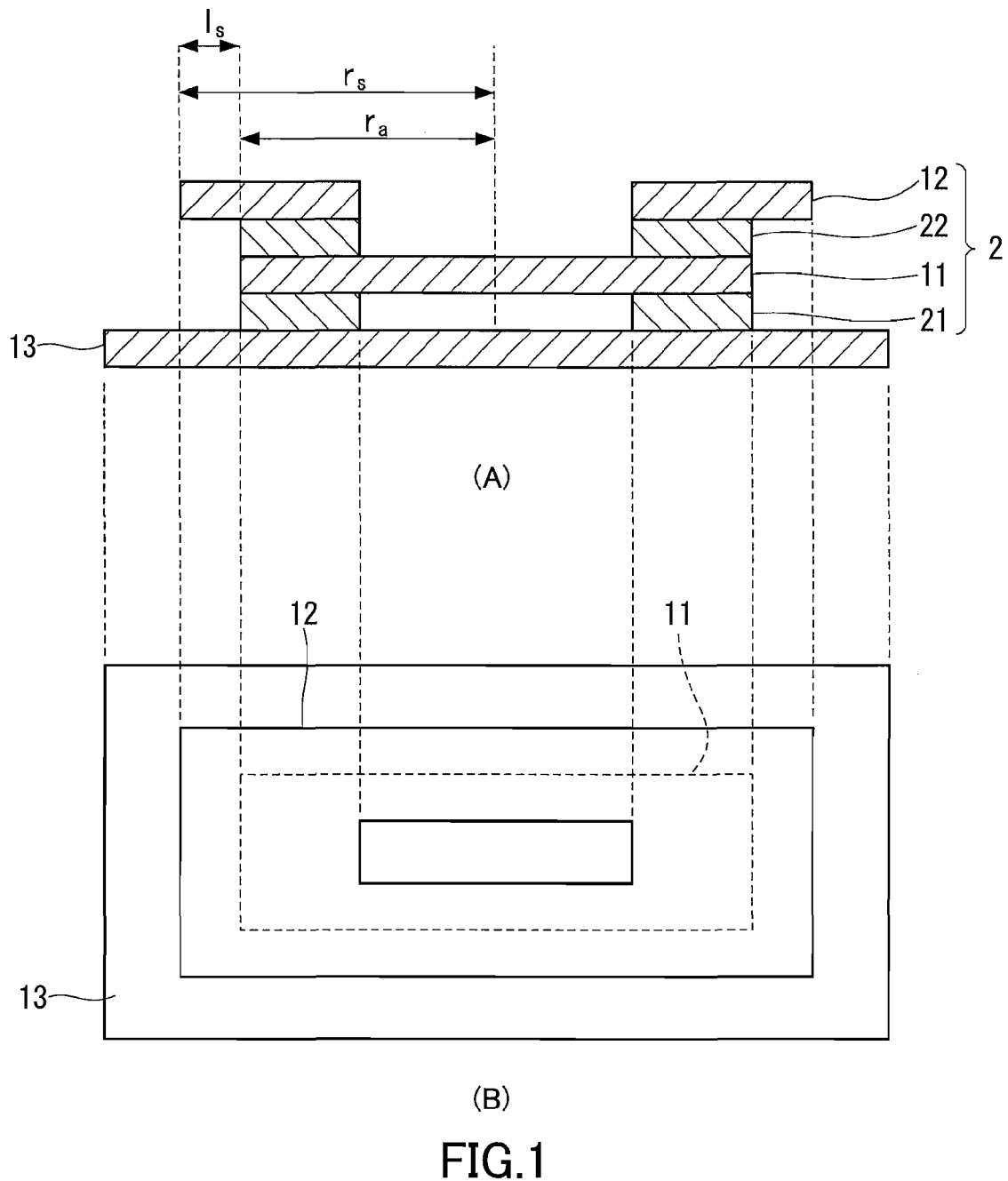
FIG. 1 is a diagram for explaining a waterproof sound transmitting member according to an embodiment of the present invention. (A) is a cross-sectional view parallel to the thickness direction of a water-proof sound transmitting membrane, and (B) is a top view observed from the side of a support layer.

FIG. 1 is a diagram for explaining a water-proof sound transmitting member according to the embodiment of the present invention. FIG. 1 (A) is a cross-sectional view thereof, and FIG. 1 (B) is a top view thereof. A water-proof sound transmitting member 2 of the present embodiment includes a water-proof sound transmitting membrane 11 and a support layer 12. A housing-side adhesive layer 21 for bonding the water-proof sound transmitting member 2 to a housing is provided on the side of one surface of the water-proof sound transmitting membrane 11. The support layer 12 is bonded to the other surface of the water-proof sound transmitting membrane 11 by a support layer-side adhesive layer 22. As shown in FIG. 1, at the time of shipment from the factory, the water-proof sound transmitting member 2 is bonded to a release paper 13 using the housing-side adhesive layer 21 and thus is supported on the release paper 13.

The water-proof sound transmitting membrane 11 is a membrane that blocks passage of foreign matters, such as liquid and dust, while allowing passage of sound. In the present embodiment, the water-proof sound transmitting membrane 11 has a rectangular shape, but it may have another shape such as a square, a polygon other than a square, or a circle.

In the present embodiment, the water-proof sound transmitting membrane 11 is formed of a polymer film. The material of the polymer film is, for example, a polymer material. Examples of the polymer material suitable for the water-proof sound transmitting membrane 11 include polyethylene (PE), polyimide (PI), polypropylene (PP), polyethylene terephthalate (PET), and polytetrafluoroethylene (PTFE). Preferably, the water-proof sound transmitting membrane 11 is porous and contains fluorine (preferably, the water-proof sound transmitting membrane 11 is composed of a fluororesin). Porous polytetrafluoroethylene is particularly suitable as the material of the water-proof sound transmitting membrane 11. The water-proof sound transmitting membrane 11 may be a nonwoven fabric, or may be formed of an assembly of nanofibers. The waterproof sound transmitting membrane 11 may be subjected to water-repellent treatment.

The support layer 12 is a layer containing no adhesive component, and increases the rigidity of the water-proof sound transmitting member 2 when it is bonded to the water-proof sound transmitting membrane 11. That is, the support layer 12 has the effect of stabilizing the shape of the water-proof sound transmitting member 2.

The support layer 12 has a structure through which sound can pass. In the present embodiment, the support layer 12 has a rectangular frame shape conforming to the four sides of the water-proof sound transmitting membrane 11, and has an opening for allowing passage of sound therethrough in the center of the rectangle. The support layer 12 is bonded to the peripheral portion of the water-proof sound transmitting membrane 11 by the support layer-side adhesive layer 22. The support layer 12 may have an annular frame shape, for example, depending on the shape of the water-proof sound transmitting membrane 11. The frame shape includes a hollow rectangular shape and an annular shape. When the material of the support layer 12 is selected from materials that are unlikely to block passage of sound, the support layer 12 may have a plate shape that covers the entire surface of the water-proof sound transmitting membrane 11.

In the present embodiment, the peripheral edge of the support layer 12 lies beyond the peripheral edge of the water-proof sound transmitting membrane 11 (that is, the entire peripheral portion of the support layer 12 also extends outwardly beyond the water-proof sound transmitting membrane 11). In this description, the term "peripheral edge" refers to the outline.

The support layer 12 can be formed of a polymer film. Examples of the material of the polymer film include polymer materials such as polyethylene (PE), polyimide (PI), polypropylene (PP), and polyethylene terephthalate (PET). Foamed polymer materials (such as PORON and SCF (registered trademark)) and urethane materials having a cushioning property can be used suitably as the material of the support layer 12. The material of the support layer 12 may be a mixture of the above-mentioned materials.

The housing-side adhesive layer 21 and the support layer-side adhesive layer 22 are each a layer containing an adhesive component. As shown in FIG. 1, in the present embodiment, the housing-side adhesive layer 21 and the support layer-side adhesive layer 22 have a rectangular frame shape having the same outline as that of the water-proof sound transmitting membrane 11 and having an opening of the same shape as the opening of the support layer 12. That is, the entire peripheral portion of the support layer 12 extends outwardly beyond the housing-side adhesive layer 21 and the support layer-side adhesive layer 22.

The specific dimensions of the support layer 12, the housing-side adhesive layer 21, and the support layer-side adhesive layer 22 are not particularly limited. The portion of the support layer 12 extending outwardly beyond the housing-side adhesive layer 21 has a width ("$l_s$" in FIG. 1 (A)) of 1.0 mm, for example. The ratio ($r_s/r_a$) of the distance ("$r_s$" in FIG. 1 (A)) from the center of the support layer 12 to the peripheral edge thereof to the distance ("$r_a$" in FIG. 1 (A)) from the center of the housing-side adhesive layer 21 to the peripheral edge thereof is, for example 1.1 to 3.0. The portion of the support layer 12 extending outwardly beyond the support layer-side adhesive layer 22 also has a width of 1.0 mm. The ratio of the distance from the center of the support layer 12 to the peripheral edge thereof to the distance from the center of the support layer-side adhesive layer 22 to the peripheral edge thereof is also 1.1 to 3.0.

In the present embodiment, the housing-side adhesive layer 21 and the support layer-side adhesive layer 22 have the same rectangular frame shape. However, they may have an annular frame shape, for example. Their outlines may be different from each other. In the present embodiment, the support layer 12, the housing-side adhesive layer 21, and the support layer-side adhesive layer 22 each have a frame shape with an opening. The openings of these layers have the same shape, but they may have different shapes.

In the waterproof sound transmitting member 2 of the present embodiment, the housing-side adhesive layer 21 is provided on the opposite side of the waterproof sound transmitting membrane 11 from the support layer 12. However, the housing-side adhesive layer 21 and the support layer 12 may be provided on the same side of the water-proof sound transmitting membrane 11.

Examples of the housing-side adhesive layer 21 and the support layer-side adhesive layer 22 include adhesive tapes containing an acrylic or silicone adhesive.

In the present embodiment, the entire peripheral portion of the support layer 12 extends outwardly beyond the housing-side adhesive layer 21. Therefore, even if the end face of the water-proof sound transmitting member 2 accidentally comes into contact with the housing when the water-proof sound transmitting member 2 is attached to the housing, only the end face of the support layer 12 contacts the housing and the end face of the housing-side adhesive layer 21 never contacts the housing. This means that the present embodiment reduces the risk of causing the end face of the water-proof sound transmitting member 2 to be bonded to the housing by the end face of the housing-side adhesive layer 21. In addition, the present embodiment reduces the risk of adhesion of foreign matters such as dust to the end face of the housing-side adhesive layer 21 after the water-proof sound transmitting member 2 is attached to the housing.

Furthermore, since the entire peripheral portion of the support layer 12 also extends outwardly beyond the support layer-side adhesive layer 22, the risk of causing the end face of the waterproof sound transmitting member 2 to be bonded to the housing by the end face of the support layer-side adhesive layer 22 also can be reduced.

Moreover, the support layer-side adhesive layer 22 is not provided on the peripheral portion of the support layer 12. Therefore, even if this peripheral portion is held with a tool such as tweezers, the adhesive component derived from the support layer-side adhesive layer 22 does not adhere to the tool. In addition, since the peripheral edge of the support layer 12 of the present embodiment lies beyond the peripheral edge of the water-proof sound transmitting membrane 11, the water-proof sound transmitting membrane 11 is kept out of the way of the tool such as tweezers used to hold the peripheral portion of the support layer 12. That is, the support layer 12 of the present embodiment suitably serves also as a holding portion.

In the water-proof sound transmitting member 2 of the present embodiment, the housing-side adhesive layer 21 is provided on the opposite side of the water-proof sound transmitting membrane 11 from the support layer 12. This means that the support layer 12 can be easily held and easily attached to the housing because a space between the support layer 12 and the release paper 13 on which the water-proof sound transmitting member 2 is supported and a space between the support layer 12 and the housing to which the water-proof sound transmitting member 2 is to be attached can be provided. Accordingly, the risk of causing the end face of the water-proof sound transmitting member 2 to come into contact with the housing accidentally is reduced when the water-proof sound transmitting member 2 is attached to the housing.

Thus, the embodiment of the present invention has been described. However, the present invention is not limited to this embodiment. Hereinafter, the other embodiments of the present invention are described collectively.

Figure 2:
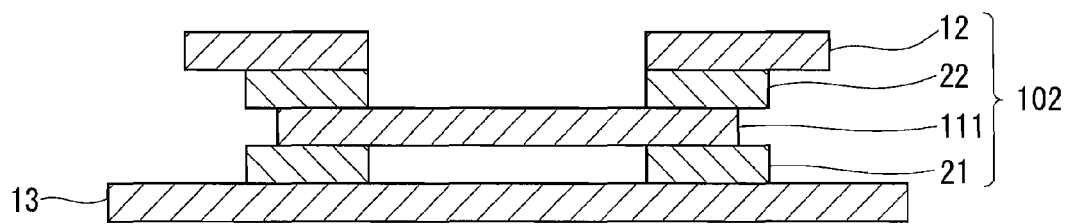
FIG. 2 is a diagram for explaining a water-proof sound transmitting member according to a first modification, and is a cross-sectional view parallel to the thickness direction of a water-proof sound transmitting membrane.

In the water-proof sound transmitting member 2 of the previously-described embodiment, the end faces of the housing-side adhesive layer 21, the water-proof sound transmitting membrane 11, and the support layer-side adhesive layer 22 are aligned with one another, but the water-proof sound transmitting member may be configured in other ways. For example, as shown in FIG. 2, a water-proof sound transmitting member 102 may be configured by replacing the water-proof sound transmitting membrane 11 in FIG. 1 by a water-proof sound transmitting membrane 111 (first modification). The peripheral edge of the membrane 111 in FIG. 2 lies within the peripheral edge of the membrane 11 in FIG. 1. In the water-proof sound transmitting member 102 shown in FIG. 2, the peripheral edge of the water-proof sound transmitting membrane 111 lies within the peripheral edge of the housing-side adhesive layer 21 and that of the support layer-side adhesive layer 22. In other words, the entire peripheral portion of the housing-side adhesive layer 21 and that of the support layer-side adhesive layer 22 extend outwardly beyond the water-proof sound transmitting membrane 111. The water-proof sound transmitting member 102 shown in FIG. 2 has the same effects as the water-proof sound transmitting member 2 shown in FIG. 1. Furthermore, the water-proof sound transmitting membrane 111 of the water-proof sound transmitting member 102 shown in FIG. 2 is smaller in size than the water-proof sound transmitting membrane 11 of the waterproof sound transmitting member 2 shown in FIG. 1. Therefore, the water-proof sound transmitting member 102 configured as shown in FIG. 2 saves the material of the water-proof sound transmitting membrane.

Figure 3:
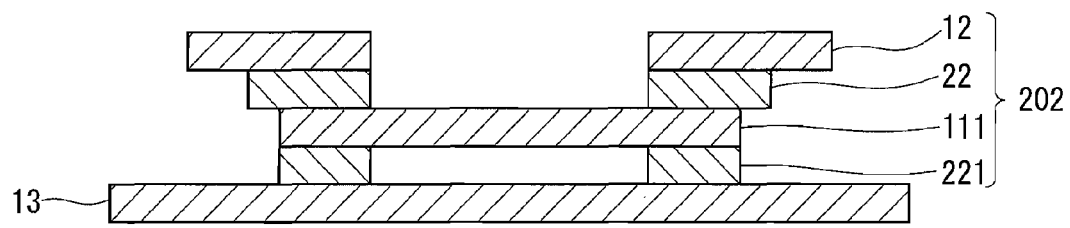
FIG. 3 is a diagram for explaining a waterproof sound transmitting member according to a second modification, and is a cross-sectional view parallel to the thickness direction of a waterproof sound transmitting membrane.

As shown in FIG. 3, a water-proof sound transmitting member 202 may be configured by replacing the housing-side adhesive layer 21 in FIG. 2 by a housing-side adhesive layer 221 (second modification). The peripheral edge of the adhesive layer 221 in FIG. 3 lies within the peripheral edge of the adhesive layer 21 in FIG. 2. In the water-proof sound transmitting member 202 shown in FIG. 3, the peripheral edge of the water-proof sound transmitting membrane 111 and the peripheral edge of the housing-side adhesive layer 221 coincide with each other. In other words, the end face of the water-proof sound transmitting membrane 111 and the end face of the housing-side adhesive layer 221 are aligned with each other. That is, in the water-proof sound transmitting member 202 shown in FIG. 3, the housing-side adhesive layer 221 does not extend outwardly beyond the water-proof sound transmitting membrane 111. Therefore, the risk of causing the end face of the water-proof sound transmitting member 202 to be bonded to the housing by the end face of the housing-side adhesive layer 221 is lower than the risk of causing the end face of the water-proof sound transmitting member 102 to be bonded to the housing by the end face of the housing-side adhesive layer 21. Furthermore, the housing-side adhesive layer 221 of the water-proof sound transmitting member 202 shown in FIG. 3 is smaller in size than the housing-side adhesive layer 21 of the water-proof sound transmitting member 102 shown in FIG. 2. Therefore, the water-proof sound transmitting member 202 configured as shown in FIG. 3 saves the material of the housing-side adhesive layer.

Figure 4:
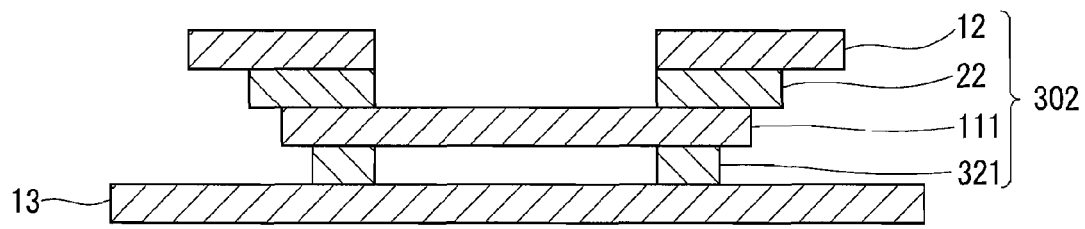
FIG. 4 is a diagram for explaining a water-proof sound transmitting member according to a third modification, and is a cross-sectional view parallel to the thickness direction of a waterproof sound transmitting membrane.

As shown in FIG. 4, a water-proof sound transmitting member 302 may be configured by replacing the housing-side adhesive layer 221 in FIG. 3 by a housing-side adhesive layer 321 (third modification). The peripheral edge of the adhesive layer 321 in FIG. 4 lies within the peripheral edge of the adhesive layer 221 in FIG. 3. In the water-proof sound transmitting member 302 shown in FIG. 4, the peripheral edge of the housing-side adhesive layer 321 lies within the peripheral edge of the waterproof sound transmitting membrane 111. That is, the entire peripheral portion of the water-proof sound transmitting membrane 111 extends outwardly beyond the housing-side adhesive layer 321. Therefore, the risk of causing the end face of the water-proof sound transmitting member 302 to be bonded to the housing by the end face of the housing-side adhesive layer 321 is lower than the risk of causing the end face of the water-proof sound transmitting member 202 to be bonded to the housing by the end face of the housing-side adhesive layer 221. Furthermore, the housing-side adhesive layer 321 of the waterproof sound transmitting member 302 shown in FIG. 4 is smaller in size than the housing-side adhesive layer 221 of the water-proof sound transmitting member 202 shown in FIG. 3. Therefore, the water-proof sound transmitting member 302 configured as shown in FIG. 4 further saves the material of the housing-side adhesive layer.

Figure 5:
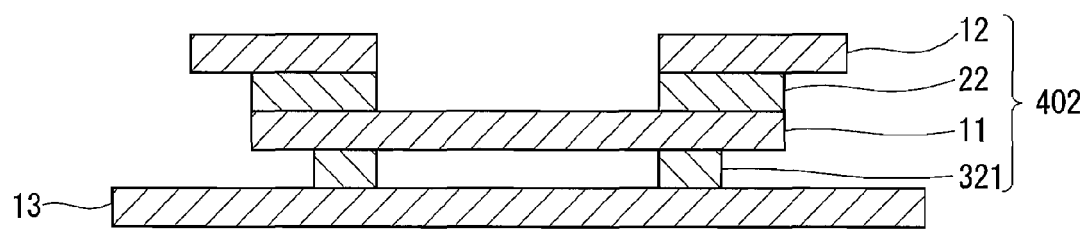
FIG. 5 is a diagram for explaining a waterproof sound transmitting member according to a fourth modification, and is a cross-sectional view parallel to the thickness direction of a water-proof sound transmitting membrane.

As shown in FIG. 5, a water-proof sound transmitting member 402 may be configured by replacing the water-proof sound transmitting membrane 111 in FIG. 4 by the water-proof sound transmitting membrane 11 in FIG. 1 (fourth modification). In the waterproof sound transmitting member 402 shown in FIG. 5, the peripheral edge of the water-proof sound transmitting membrane 11 and the peripheral edge of the support layer-side adhesive layer 22 coincide with each other. In other words, the end face of the waterproof sound transmitting membrane 11 and the end face of the support layer-side adhesive layer 22 are aligned with each other. That is, in the water-proof sound transmitting member 402 shown in FIG. 5, the support layer-side adhesive layer 22 does not extend outwardly beyond the water-proof sound transmitting membrane 11. Therefore, the risk of causing the end face of the water-proof sound transmitting member 402 to be bonded to the housing by the end face of the support layer-side adhesive layer 22 is lower than the risk of causing the end face of the water-proof sound transmitting member 302 to be bonded to the housing by the end face of the support layer-side adhesive layer 22.

Figure 6:
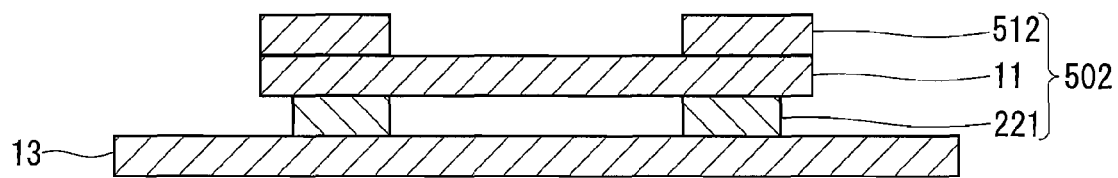
FIG. 6 is a diagram for explaining a waterproof sound transmitting member according to a fifth modification, and is a cross-sectional view parallel to the thickness direction of a waterproof sound transmitting membrane.

As shown in FIG. 6, a water-proof sound transmitting member 502 may be configured by bringing a support layer 512 into direct contact with the water-proof sound transmitting membrane 11 provided with the housing-side adhesive layer 221 (fifth modification). In the water-proof sound transmitting member 502 shown in FIG. 6, the peripheral edge of the water-proof sound transmitting membrane 11 and the peripheral edge of the support layer 512 coincide with each other (in other words, the end face of the water-proof sound transmitting membrane 11 and the end face of the support layer 512 are aligned with each other), and the entire peripheral portion of the water-proof sound transmitting membrane 11 and the entire peripheral portion of the support layer 512 extend outwardly beyond the housing-side adhesive layer 221. Therefore, the risk of causing the end face of the water-proof sound transmitting member 502 to be bonded to the housing by the end face of the housing-side adhesive layer 221 is low for the same reasons as in the case of the configuration of the water-proof sound transmitting member 302 and the water-proof sound transmitting member 402. Furthermore, the water-proof sound transmitting member 502 does not have an adhesive layer between the water-proof sound transmitting membrane 11 and the support layer 512. Therefore, the risk of causing the end face of the water-proof sound transmitting member 502 to be bonded to the housing at a position other than the normal attachment position is lower than the risk in the case where an adhesive layer is provided between the water-proof sound transmitting membrane 11 and the support layer 512. The method for bonding the support layer 512 directly to the water-proof sound transmitting membrane 11 as shown in FIG. 6 is, for example, heat lamination.

INDUSTRIAL APPLICABILITY

The water-proof sound transmitting member of the present invention can be suitably attached to housings of electronic apparatuses such as a cellular phone, a cordless phone, and a digital camera.

The invention claimed is:

1. A water-proof sound transmitting member having a multilayer structure, comprising:
   a water-proof sound transmitting membrane to be attached to a housing having a hole that allows sound to pass therethrough;
   a support layer to be attached to the housing together with the water-proof sound transmitting membrane, the support layer allowing sound to pass therethrough;
   a housing-side adhesive layer for bonding the water-proof sound transmitting membrane to the housing; and
   a support layer-side adhesive layer, wherein
   an entire peripheral portion of the support layer extends outwardly beyond the housing-side adhesive layer,
   the support layer has a frame shape, a peripheral edge of which lies beyond a peripheral edge of the water-proof sound transmitting membrane, and is bonded to a peripheral portion of the water-proof sound transmitting membrane by the support layer-side adhesive layer, and
   the entire peripheral portion of the support of the support layer also extends outwardly beyond the support layer-side adhesive layer.

2. The water-proof sound transmitting member according to claim 1, wherein the housing-side adhesive layer is provided on an opposite side of the water-proof sound transmitting membrane from the support layer.

3. The water-proof sound transmitting member according to claim 2, wherein a peripheral edge of the housing-side adhesive layer lies within a peripheral edge of the water-proof sound transmitting membrane.

4. The waterproof sound transmitting member according to claim 1, wherein the water-proof sound transmitting membrane is a membrane composed of a fluororesin.

5. The water-proof sound transmitting member according to claim 4, wherein the fluororesin is porous polytetrafluoroethylene.

* * * * *